United States Patent [19]

Bernard et al.

[11] Patent Number: 5,305,087
[45] Date of Patent: Apr. 19, 1994

[54] OPTICAL RING RESONATOR SENSOR

[75] Inventors: Walter Bernard, Daisendorf, France; Götz Geister, Salem Mimmenhausen; Michael Raab, Salem, both of Fed. Rep. of Germany

[73] Assignee: Bodenseewerk Geratetechnik GmbH, Fed. Rep. of Germany

[21] Appl. No.: 846,024

[22] Filed: Mar. 5, 1992

[30] Foreign Application Priority Data

Mar. 12, 1991 [DE] Fed. Rep. of Germany ....... 4107915

[51] Int. Cl.$^5$ .............................................. G01C 19/72
[52] U.S. Cl. ...................................... 356/350; 372/94
[58] Field of Search ........................... 356/350; 372/94

[56] References Cited

U.S. PATENT DOCUMENTS 5,004,342  4/1991  Bernard et al. ..................... 356/350

FOREIGN PATENT DOCUMENTS

0141062A1   7/1984   European Pat. Off. .
0290723A1   2/1988   European Pat. Off. .
0405821A1   6/1990   European Pat. Off. .
3712815A1  11/1988   Fed. Rep. of Germany .

OTHER PUBLICATIONS

"The Passive Resonator Fiber Optic Gyro and Comparison to the Interferometer Fiber Gyro", R. Carroll, C. D. Coccoli, D. Cardarelli, G. T. Coate, SPIE, 719, Fiber Optic Gyros: 10th Anniversary Conference (1986), 169–177.

"Modulatable narrow-linewidth semiconductor lasers", L. Hollberg and M. Ohtsu, Appl. Phys. Lett., 53, (1988), 944–946.

"Frequency Noise Analysis of Optically Self-Locked Diode Lasers", Ph. Laurent, A. Clairon and Ch. Bréant, IEEE Journal of Quantum Electronics, 25, (1989), 1131–1142.

"Laser-frequency division and stabilization", R. G. DeVoe and R. G. Brewer, Physical Review A, 30, (1984), 2827–2829.

*Fiber Optics Technology and Applications*, Stewart D. Personick, Plenum Press, New York, 1985, p. 231.

*Optical Fiber Sensors*, A. N. Chester. S. Martellucci, A. M. Verga Scheggi, Martinus Nijhoff Publishers, Boston, 1987, p. 300.

*Fibre Optic Systems*, Pierre Halley, John Wiley & Sons, New York, 1987, p. 144–147.

*Fiber-Optic Rotation Sensors and Related Technologies*, S. Ezekiel and H. J. Arditty (eds.), Springer-Verlag, New York, 1982, pp. 2–27.

*Nonlinear Photonics*, H. M. Gibbs, G. Khitrova, N. Peyghambarian (eds.), Springer-Verlag, New York, pp. 168–169.

Primary Examiner—Vincent P. McGraw
Attorney, Agent, or Firm—Dougherty, Hessin, Beavers & Gilbert

[57] ABSTRACT

A sensor is to measure a physical quantity which causes a non-reciprocal effect, such as the Sagnac-effect, in an optical ring resonator. This effect provides a difference of clockwise and counter-clockwise optical path lengths in the ring resonator. The difference is proportional to the physical quantity, such as rotation rate in the case of the Sagnac-effect. A semiconductor laser is coupled to the ring resonator and generates clockwise and counter-clockwise beams therein. The laser frequency is modulated by directly energizing the semiconductor laser such that sidebands of the frequency-modulated laser beams are in resonance with the ring resonator. A detector device responds to the difference of the clockwise and counter-clockwise light beams and generates a signal indicative of the measured physical quantity.

11 Claims, 2 Drawing Sheets

OPTICAL RING RESONATOR SENSOR

BACKGROUND OF THE INVENTION

1. Field of the Invention

The invention relates to a sensor for measuring a physical quantity which causes a non-reciprocal effect in an optical ring resonatormeasuring quantity.

In particular, the invention relates to a sensor which is based on the fact that the measuring quantity causes non-reciprocal effects on a ring resonator. Such non-reciprocal effects are, for example, the Sagnac-effect or the Faraday-effect. The Sagnac-effect is, for example, used for producing "laser gyros".

2. Description of the Prior Art

From DE-OS 37 12 815 or EP-PS 0 290 723 (substantially with the same teaching) a measuring instrument for rotation rates making use of the Sagnac-effect is known, which contains a ring resonator and a laser. Therein, the ring resonator forms a part of the resonator cavity of the laser. Thereby, no precautions have to be taken to achieve optical insulation between laser and ring resonator. A semiconductor laser serves as laser. Therein, different embodiments of the ring resonator having mirrors, integrated optics or fiber optics are described. A phase modulation of the laser is effected by periodic variation of the light path contained in the ring resonator. The light path is adjusted such that the frequency of the laser light corresponds to the resonance frequency of the ring resonator for one direction of circulation of the light. The derivative of the intensity of the light circulating in the other direction of circulation with respect to the phase, practically the a.c. component of the modulated light, then is indicative of the rotation rate. In DE-OS 37 12 815 it is also proposed to modulate the laser directly through the control of an injection current. In practice, however, the difficulty arises, that the modulation capability of the laser is reduced by the feedback of the light from the external oscillator.

A fiber gyro having a passive ring resonator is described in a paper by Carroll, Coccoli, Cardarelli and Coate. "The Passive Resonator Fiber Optic Gyro and Comparison to the Interferometer Fiber Gyro", in "SPIE", vol. 719 Fiber Optic Gyros: 10th Anniversary Conference (1986), 169–177. The light from the laser is modulated by a phase modulator for generating sidebands and is guided in two fiber branches. An acousto-optical frequency shifter is located in each of the two fiber branches. From the two fiber branches the light is coupled into a fiber ring with opposite direction of circulation. Correspondingly, the light which has passed the fiber ring in one or the other direction of circulation is coupled out by couplers and guided to photoelectric detectors. The detector signals are applied to signal processing means. These control the laser frequency on one hand, and one of the frequency shifters on the other hand. Thus, when a rotation rate occurs, the frequency of the laser light is kept in resonance with one direction of circulation of the ring resonator formed by the fiber ring, whereas a corresponding frequency shift is effected in the other direction of circulation.

From a paper by Hollberg and Ohtsu, "Modulatable narrow-linewidth semiconductor lasers", in Appl. Phys. Lett. 53 (1988), 944–946 it is known to improve the bandwidth of a semiconductor laser by optical feedback from an external resonator cavity. Therein, it is also said that the modulation capability of the laser is reduced by such an optical feedback. Therein, it is also said that certain modulation frequencies exist which strongly affect the frequency modulation properties of the optically stabilized semiconductor laser. In certain modulation states, some or all of the modulation sidebands can be in resonance with the resonator cavity with or without carrier. In this case these sidebands return to the semiconductor laser and amplify its optical stabilization. This is particularly valid for the free spectral distance of the resonator cavity or the harmonics thereof. In this way, it is possible to modulate the laser current with a high modulation index and to generate many sidebands without disturbing the frequency stabilization and the linewidth narrowing which is achieved by the optical feedback.

In a paper by Laurent, Clairon and Bréant, "Frequency Noise Analysis of Optically Self-Locked Diode Lasers" in *Journal of Quantum Electronics*, vol. 25 (1989), 1131–1142, it is illustrated how the frequency of an optically fed back semiconductor laser varies as a function of the frequency of the "undisturbed" semiconductor laser, and shows the strong reduction of the modulation capability.

In a paper by DeVoe and Brewer, "Laser-frequency division and stabilization", in *Physical Review A*, vol. 30 (1984), 2987–2889 an arrangement is illustrated, in which a laser is turned by a control circuit to a higher order of a reference cavity. The reference cavity is tuned by a second control circuit to a high frequency. Thus, the laser can be stabilized by means of the high frequency.

European patent application 0 405 831 discloses a ring resonator gyro, wherein the clockwise and counterclockwise beams are modulated to provide each with a spectrum including a carrier and an upper and lower side band. The upper side band of one beam is kept at a resonance by a path length control loop, and the upper side band of the other beam is kept at a resonance by a rate control loop.

SUMMARY OF THE INVENTION

It is the object of the invention to achieve an improved sensor for non-reciprocal effects in ring resonators.

According to the invention this object is achieved by a sensor comprising (a) an optical ring resonator with a first and a second direction of circulation of the light, the optical path lengths of the ring resonator for the first and the second direction of circulation of the light in the ring resonator being differently varied by said non-reciprocal effect as a function of said physical quantity, (b) a semiconductor laser, which is coupled to the ring resonator to generate a light wave circulating in said first direction of circulation and a light wave circulating in said second direction of circulation, said ring resonator forming a part of a resonator cavity of said semiconductor laser, said laser operating at a laser frequency, (c) means for modualting said laser frequency of said semiconductor laser by directly energizing the semiconductor laser such that sidebands of the frequency-modulated laser light wave are in resonance with said ring resonator, and (d) detector means which respond to the differences of the light waves circulating in said first and said second directions of circulation for generating a signal indicative of said physical quantity.

Through the invention, an integrated sensor is achieved. A semiconductor laser is stabilized by an external resonator cavity. By the optical feedback the semiconductor laser becomes narrow-banded. The semiconductor laser thus provided with optical feedback is modulated in a simple way at a high frequency.

The number of components of the sensor is minimized. Each component serves several functions. The semiconductor laser is not only light source but forms a part of the sensor, the behaviour of which is also determined by the measuring quantity. Herein, the ring resonator determining the frequency of the semiconductor laser is at the same time a sensor element for nonreciprocal effects, for example for the Sagnac-effect when rotary rates occur. The semiconductor laser is not only light source but at the same time modulator which is directly energized to achieve the frequency modulation.

In the invention, as in DE-OS 37 12 815, the ring resonator is operated in feedback with the semiconductor laser located outside the ring resonator. Thereby the semiconductor laser gets very narrow-banded. An optical insulator is not necessary between semiconductor laser and ring resonator. On the other hand, the semiconductor laser need not be coated. By the resonant feedback of the sidebands, the problem of the reduced frequency modulation capability is solved. Thereby, it is possible to modulate the semiconductor laser with lower modulation index. This results in reduction of the disturbing amplitude modulation component. The narrow-bandedness of the semiconductor laser is not deteriorated by the modulation because its frequency spectrum mainly remains fed back optimally. Due to modulation frequencies in the high frequency range (radiofrequency range), the sensor operates outside the base band and beyond the 1/f-noise, whereby higher sensitivities are achieved.

DESCRIPTION OF PREFERRED EMBODIMENTS

An embodiment of the invention will now be described in greater detail with reference to the accompanying drawings.

Figure 1:
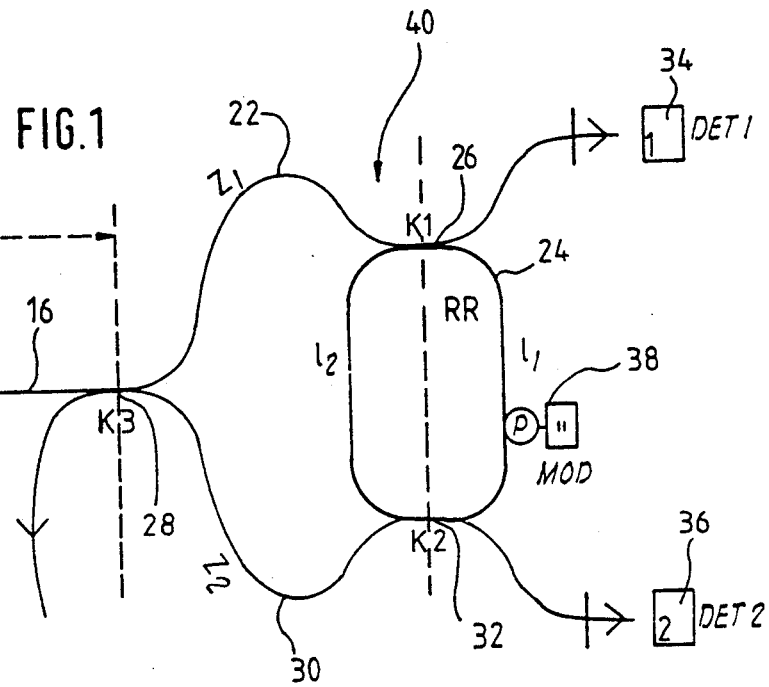
FIG. 1 is a schematic illustration of a sensor constructed with fiber optics and a ring resonator, which sensor responds to non-reciprocal effects such as the Sagnac-effect.

In FIG. 1 numeral 10 designates a semiconductor laser (laser diode). Through the injection current the semiconductor laser 10 can be frequency-modulated with a high frequency $f_{mod}$ (radiofrequency) from a high frequency source 12. The laser light is guided through a lens system 14 to a light-guiding fiber 16. The light-guiding fiber contains a phase actuator 18 and an attenuator 20. The laser light in the fiber 16 is, on one hand, guided along a path 22 to the "upper" portion of a fiber ring 24, as shown in FIG. 1. Through a coupler 26 the laser light is coupled into the fiber ring 24 clockwise in FIG. 1. Through a coupler 28, part of the laser light guided in the fiber 16 is coupled into a fiber 30. Then, through a further coupler 32 at the location opposite the coupler 26, this laser light is coupled into the fiber ring 24 counterclockwise in FIG. 1. The fiber 22 leads to a first photoelectric detector 34. The fiber 30 leads to a second photoelectric detector 36. A further phase actuator 38 is connected in the section of the fiber ring 24 between the couplers 26 and 32.

The arrangement can also be constructed in integrated optics with corresponding wave guides provided in a substrate. It is also possible to construct the arrangement with completely reflecting or semireflecting mirrors similar to the illustration in DE-OS 37 12 815.

Figure 2:
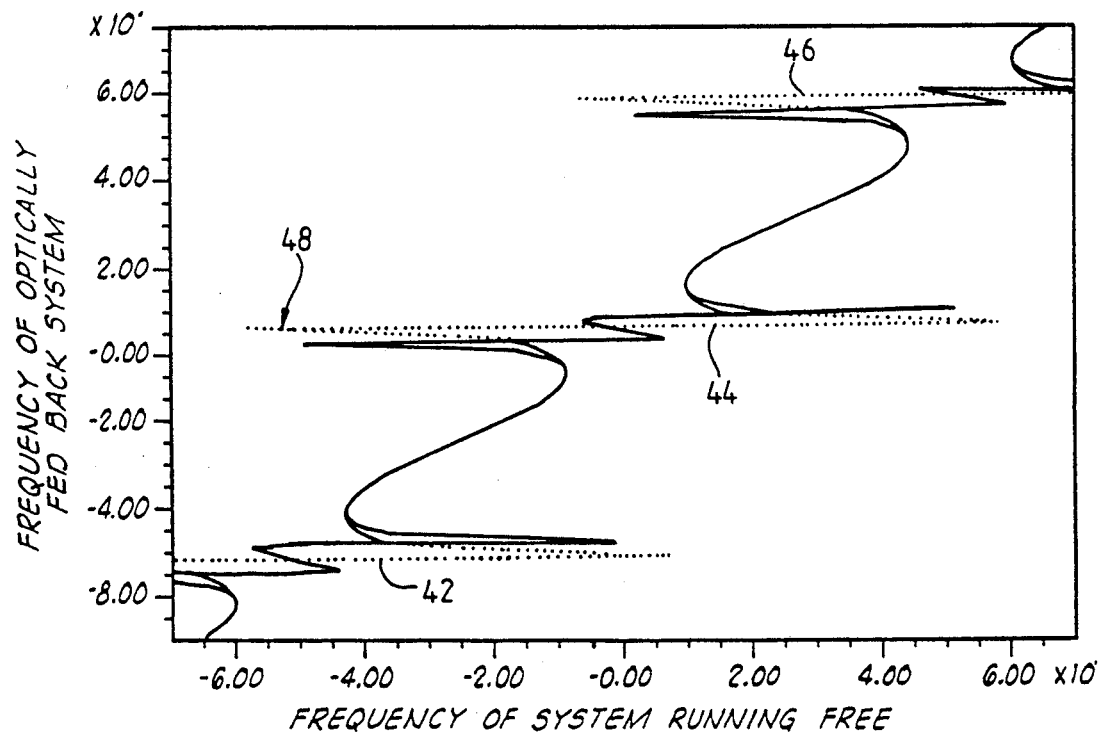
FIG. 2 is a graph showing the frequency of an optically fed back system as a function of the frequency of the system running free, and this without and with the non-reciprocal effect to be measured.

The light-guiding fibers form an external ring resonator 40. The semiconductor laser 10 is operated in optical feedback with the ring resonator 40. A part of the laser light emitted from the semiconductor laser 10 is returned with a time-delay into the semiconductor laser 10 after having passed through the ring resonator 40. For this reason, the semiconductor laser 10 is not insulated from the ring resonator 40 through an "optical diode", as it is the case in most of the systems having passive ring resonators. Operating points can be found for such a mode of operation, in which operating points the semiconductor laser 10 operates steadily at one single frequency $f_o$. These operating points are determined by the transmission frequency and quality of the external ring resonator, the amplitude and phase of the optical feedback, the characteristic of current versus power or of current versus wavelength, respectively, of a semiconductor laser 10 without feedback, and by a certain ratio of the lengths $Z_1$, $Z_2$ and $Z_3$ of the supply waveguide and the partial lengths $1_1$ and $1_2$ of the partial lengths of the fiber ring 24. For small feedback amplitudes, stability ranges of the semiconductor laser 10 result in the form of "plateaus" 42, 44, 46 in a diagram illustrated by dotted lines in FIG. 2.

When measuring non-reciprocal effects, for example when measuring rotation rates by means of the Sagnac-effect as described in DE-OS 37 12 815, the frequency of the semiconductor laser 10 has to be modulated relative to a resonance frequency of the ring resonator 40. However, the optical feedback counteracts the modualtion capability of the semiconductor laser 10. The optical feedback tends to stabilize the laser at a resonance frequency of the ring resonator 40. Thus, the gradient of the frequency modulation characteristic is reduced particularly in the range of lower frequencies.

Now, it has been found that the gradient of the frequency modulation characteristic increases when the modulation frequency $f_{mod}$ is in a rational ratio to the free spectral distance FSR of the ring resonator, that means the distance between the fundamental resonance $q_o$ of the ring resonator and the adjacent natural resonances. Then, $$f_{mod} = j/k \cdot FSR,$$

j and k being integers. This can be recognized from the fact that the light intensity transmitted by the ring resonator increases resonance-like.

Figure 3:
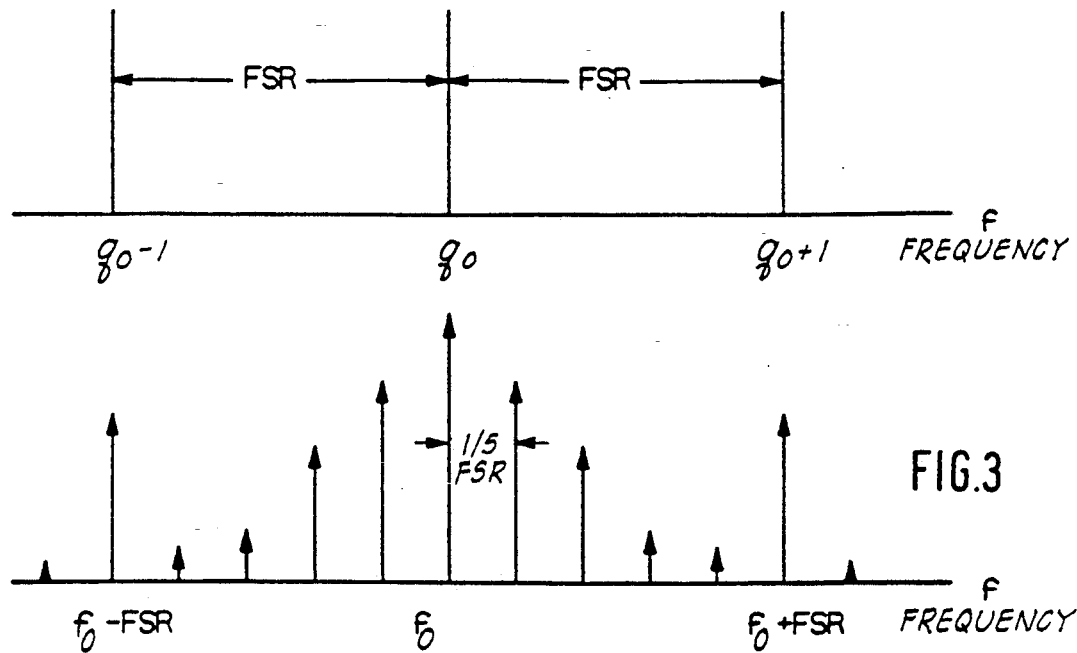
FIG. 3 shows the modulation spectrum of the optically fed back semiconductor laser in relation with the spectrum of the natural resonances of the ring resonator.

Normally, when modulating a semiconductor laser with optical feedback from a ring resonator, the semiconductor laser would substantially emit light at one frequency only which corresponds to the resonance frequency $q_o$ of the ring resonator. In the experiment of the frequency modulation by directly energizing the semiconductor laser, only very weak sidebands would result. This corresponds to a weak frequency modulation. If not only the carrier frequency $f_o$ but also at least one of the sidebands is in resonance with a resonance frequency of the ring resonator, this also has an effect on the sidebands located between carrier frequency and sideband in resonance. These sidebands likewise appear stronger in spectrum. This is illustrated in the FIG. 3. The resonance frequencies $q_o$ and $q_{o-1}$ and $q_{o+1}$ of the ring resonator are illustrated in FIG. 3. The resonance frequencies $q_{o-1}$ and $q_{o+1}$ are located at a distance FSR, the free spectral distance, from the resonance frequency $q_o$.

Now, the semiconductor laser 10 is energized and modulated such that the carrier frequency $f_o$ coincides with the resonance frequency $q_o$ and, at the same time, the fifth sidebands on each side of the carrier frequency coincide with the resonance frequencies $q_{o-1}$ and $q_{o+1}$ of the ring resonator 40. It can be seen that, due to the resonances, not only the fifth sidebands but also the intermediate sidebands get stronger. However, as compared to the normal case of a semiconductor laser with optical feedback, this means an improved modulation capability. The stabilization of the laser frequency, nevertheless, remains.

Generally, the k-th sideband can coincide with the j-th resonance frequency of the ring resonator 40 in order to achieve such an effect. For a ring resonator $$f_{mod} = j/k * c/(l_1 + l_2),$$

$l_1$ and $l_2$ being the optical path lengths of the fiber ring 24 between the couplers 26 and 32 running clockwise and counter-clockwise, respectively.

For measuring non-reciprocal effects, for example for measuring the rotation rate by means of the Sagnac-effect, the carrier frequency and at least one of the sidebands are brought into resonance with the ring resonator. By the light which, starting from the semiconductor laser 10 (FIG. 1), gets through the fibers 16 and 22 to the detector 34 or through the fibers 16 and 30 to the detector 36, the resonance frequency $q_o$ of the ring resonator and the resonant sidebands $q_{o-1}$ and $q_{o+1}$ from the ring resonator 40 are guided particularly strongly to the ring resonator 40. The other frequencies reach the detectors 34 and 36 almost undisturbed. A control circuit provides that the carrier frequency $f_o$ and the sidebands $f_o +/- j$ FSR are located exactly in the "resonant valleys".

Figure 4:
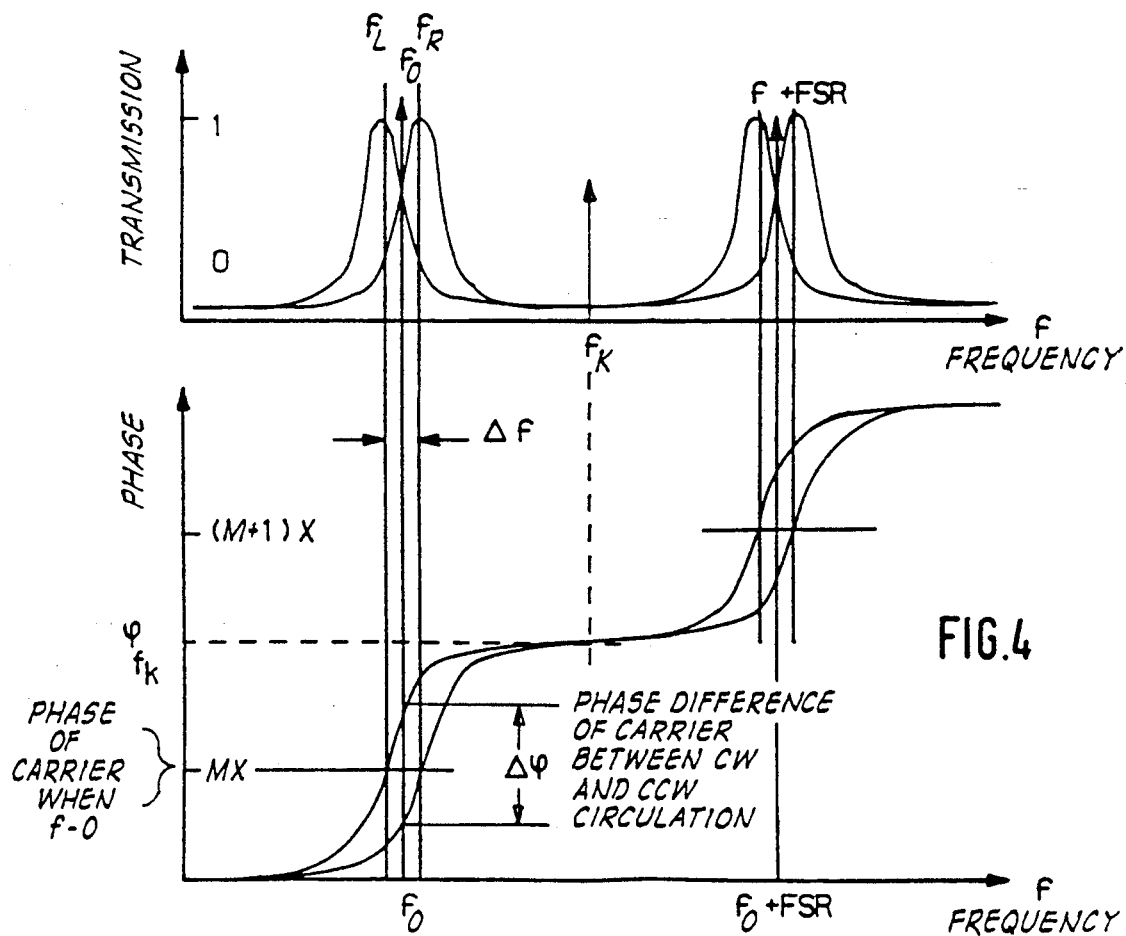
FIG. 4 shows the transmission of the ring resonator and the phase of the light coupled out as a function of the frequency for laser light running right-handedly and left-handedly, when a non-reciprocal effect occurs.

When a non-reciprocal effect occurs in the ring resonator 40, the resonance functions of the ring resonator 40 is split up for circulations of the laser light of opposite directions. This is illustrated in FIG. 4. The splitting-up $\Delta f$ is proportional to the non-reciprocal effect. For the Sagnac-effect, it yields:

$$\Delta f = \frac{4A}{\lambda(l_1 + l_2)} \cdot \Omega$$

The maxima of the transmission of the ring resonator 40 are located at shifted frequencies $f_L$ and $f_R$, respectively. A phase shift is effected at the same time as the amplitude shift, as illustrated in the lower part of FIG. 4. A phase difference $\Delta f$ occurs in the range of the resonances between the laser light running clockwise and the laser light running counter-clockwise. For frequencies not located in the range of the resonance, e.g. the frequency $f_k$ in FIG. 4, there is no phase difference between the light passing the ring resonator 40 right-handedly and left-handedly.

If the difference of the signals from the detectors 34 and 36 is formed and the frequency of the laser light is modulated as described, a component of the signal with the modulation frequency results. This component is a measure of the non-reciprocal effect to be measured, that means, for example, of the variation of the optical path length by the Sagnac-effect with a rotary rate about an axis perpendicular to the plane of the fiber ring.

In order to achieve a well-defined weak feedback, a non-coated laser diode can be used. Also an attenuator 20 in the form of an optical diode can be provided. The requirements on the insulation of such an optical diode are much lower than, for example, in the communication engineering. An insulation of 20 dB (roundtrip value) is a usable value for the present purposes.

What is claimed is:

1. A sensor for measuring a physical quantity wherein said quantity causes a non-reciprocal effect in an optical ring resonator, comprising:

(a) an optical ring resonator characterized by a free spectral range (FSR) and a resonance frequency defining a first direction of light propagation and a second direction of light propagation therein and a first optical path length and a second optical path length associated with said first and second directions of light propagation, respectively, and wherein said first and second optical path lengths are varied differently depending on said physical quantity when said optical ring resonator is exposed to said physical quantity to cause said non-reciprocal effect;

(b) a semiconductor laser for generating a laser light wave;

(c) an energizer for directly energizing said semiconductor laser so that said semiconductor laser is further characterized by a semiconductor laser frequency and wherein said semiconductor laser frequency depends on the degree of energization by said energizer;

(d) a modulator for controlling said energizer to modulate said laser light wave of said semiconductor laser at a modulation frequency $f_{mod} = j/k$ * FSR, wherein j and k are integers and FSR is the free spectral range of said optical ring resonator, whereby a carrier frequency and sidebands further characterized by sideband frequencies are generated in said laser light wave;

(e) a first light guide for coupling a part of said laser light wave into said optical ring resonator to provide a first circulating light wave circulating in said optical ring resonator in said first direction of light propagation;

(f) a second light guide for coupling a part of said laser light wave into said optical ring resonator to provide a second circulating light wave circulating in said optical ring resonator in said second direction of light propagation;

(g) a first detector and a second detector:

(h) a first light director for directing part of said first circulating light wave onto said first detector resulting in a first detector signal;

(i) a second light director for directing part of said second circulating light wave onto said second detector resulting in a second detector signal;

(j) a frequency controller for maintaining said carrier frequency at a first resonance frequency of said optical ring resonator and for maintaining at least one of said sideband frequencies at a second resonance frequency of said optical ring resonator, said carrier frequency and said at least one sideband frequency being spaced by $+/-$ m * FSR, wherein m is an integer; and (k) a signal processor for determining the difference between said first and second detector signals, said difference providing a measure of said physical quantity.

2. The sensor of claim 1 wherein said non-reciprocal effect is the Segnac-effect and said physical quantity measured is angular rate.

3. The sensor of claim 1 wherein said modulator is further characterized by a high modulation frequency so that said sensor is operated outside a base band and beyond 1/f-noise so that high sensitivity is achieved.

4. The sensor of claim 3 wherein said modulation frequency is in a radio frequency range.

5. The sensor of claim 1 wherein said first and second light guides are light guiding fibers.

6. The sensor of claim 5 wherein said first and second light guides further include an attenuator.

7. The sensor of claim 6 wherein said attenuator is an optical diode having an insulation value of 20 dB measured for round trip light transmission.

8. The sensor of claim 1 wherein said sensor is fabricated using integrated optics on a substrate and waveguides in said substrate transmit said laser light wave from said semiconductor laser.

9. The sensor of claim 1 further including mirrors.

10. The sensor of claim 1 wherein said first and second light detectors are photo electric detectors.

11. A method for measuring a physical quantity which causes a non-reciprocal effect in an optical ring resonator, comprising:

(a) using an optical ring resonator characterized by a free spectral range (FSR) to define a first direction of light propagation and a second direction of light propagation in said optical ring resonator and a first optical path length and a second optical path length associated with said first and second directions of light propagation, respectively, and wherein said first and second optical path lengths are varied differently depending on said physical quantity when said optical ring resonator is exposed to said physical quantity which causes said non-reciprocal effect;

(b) generating a laser light wave using a semiconductor laser;

(c) directly energizing said semiconductor laser with an energizer so that said semiconductor laser is further characterized by a semiconductor laser frequency and so that said semiconductor laser frequency depends directly on the degree to which said semiconductor laser is energized;

(d) controlling said energizer with a modulator to modulate said laser light wave of said semiconductor laser at a modulation frequency $f_{mod}=j/k$ * FSR, wherein j and k are integers and FSR is the free spectral range of said optical ring resonator, to generate a carrier frequency and sidebands further characterized by sideband frequencies in said laser light wave;

(e) coupling a part of said laser light wave into said optical ring resonator using a first light guide to provide a first circulating light wave circulating in said optical ring resonator in said first direction of light propagation;

(f) coupling a part of said laser light wave into said optical ring resonator using a second light guide to provide a second circulating light wave circulating in said optical ring resonator in said second direction of light propagation;

(g) directing part of said first circulating light wave onto a first detector to produce a first detector signal;

(h) directing part of said second circulating light wave onto a second detector to produce a second detector signal;

(i) maintaining said carrier frequency at a first resonance frequency of said optical ring resonator and maintaining at least one of said sideband frequencies at a second resonance frequency of said optical ring resonator, said carrier frequency and said at least one sideband frequency being spaced by $+/-$ m * FSR, wherein m is an integer using a frequency controller; and (j) determining the difference between the first and second detector signals, said difference providing a measure of said physical quantity, using a signal processor.

* * * * *

UNITED STATES PATENT AND TRADEMARK OFFICE
CERTIFICATE OF CORRECTION

PATENT NO. : 5,305,087
DATED : April 19, 1994
INVENTOR(S) : Walter Bernard, Götz Geister and Michael Raab It is certified that error appears in the above-identified patent and that said Letters Patent is hereby corrected as shown below:

On title page, item [75] "Walter Bernard" is a resident of Daisendorf, Germany.

Column 2, line 28, delete "turned" and insert --tuned-- therefor.

Column 2, line 33, delete "0 405 831" and insert --0 405 821-- therefor.

Column 7, line 20, delete "Segnac-effect" and insert --Sagnac-effect-- therefor.

Signed and Sealed this

Sixth Day of September, 1994

Attest:

BRUCE LEHMAN

*Attesting Officer*      *Commissioner of Patents and Trademarks*